United States Patent
Raymond

(10) Patent No.: US 9,254,882 B2
(45) Date of Patent: Feb. 9, 2016

(54) TANDEM BICYCLE

(71) Applicant: Shawn C. Raymond, Palo Alto, CA (US)

(72) Inventor: Shawn C. Raymond, Palo Alto, CA (US)

( * ) Notice: Subject to any disclaimer, the term of this patent is extended or adjusted under 35 U.S.C. 154(b) by 0 days.

(21) Appl. No.: 14/376,215

(22) PCT Filed: Feb. 1, 2013

(86) PCT No.: PCT/US2013/024315
§ 371 (c)(1),
(2) Date: Aug. 1, 2014

(87) PCT Pub. No.: WO2013/116626
PCT Pub. Date: Aug. 8, 2013

(65) Prior Publication Data
US 2015/0001827 A1    Jan. 1, 2015

Related U.S. Application Data

(60) Provisional application No. 61/593,718, filed on Feb. 1, 2012.

(51) Int. Cl.
*B62M 9/00*    (2006.01)
*B62K 3/12*    (2006.01)
(Continued)

(52) U.S. Cl.
CPC ... *B62K 3/12* (2013.01); *B62K 3/14* (2013.01); *B62M 1/36* (2013.01); *B62M 9/00* (2013.01)

(58) Field of Classification Search
CPC .............. B62K 3/12; B62K 3/14; B62M 1/36
See application file for complete search history.

(56) References Cited

U.S. PATENT DOCUMENTS

| | | | | |
|---|---|---|---|---|
| 474,400 | A * | 5/1892 | McKenna | 280/202 |
| 4,502,705 | A * | 3/1985 | Weaver | 280/231 |
| 4,600,206 | A * | 7/1986 | Di Paolo | 280/231 |
| 4,666,172 | A * | 5/1987 | Hartmann | 280/238 |

(Continued)

FOREIGN PATENT DOCUMENTS

| | | |
|---|---|---|
| CA | 2233696 A1 | 10/1999 |
| EP | 0133542 A2 | 2/1985 |
| JP | 2008-302708 A | 12/2008 |
| KR | 1982-0000702 Y1 | 4/1982 |

OTHER PUBLICATIONS

International Searching Authority of the Korean Intellectual Property Office regarding PCT Patent Application No. PCT/US2013/024315 "International Search Report" dated May 14, 2013, 2 pages.

(Continued)

*Primary Examiner* — Kevin Hurley
(74) *Attorney, Agent, or Firm* — Kolisch Hartwell, P.C.

(57) ABSTRACT

A tandem bicycle is provided that have a shortened wheel base between the front and rear wheels that allows a rider to ride comfortably alone from either the front or rear seats, or with a passenger in the front seat. The frame length of the inventive tandem bicycle is comparable to a standard single seat bicycle. The reduced proximity between riders, and the ability to steer for both the front or rear seats on the inventive tandem bicycle improves the level of participation and interaction between the riders. The wheelbase is reduced by bringing the front wheel closer to the front seat position. A reduced diameter front wheel is provided to accommodate rotational clearance of the front pedals thereby allowing two riders to ride on bicycle frame with a length common to single rider bicycle.

20 Claims, 6 Drawing Sheets

(51) Int. Cl.
*B62M 1/36* (2013.01)
*B62K 3/14* (2006.01)

(56) References Cited

U.S. PATENT DOCUMENTS 5,135,246 A    8/1992  Montague
5,211,415 A *  5/1993  Gasiorowski ............. 280/281.1
5,503,419 A *  4/1996  Gardner ..................... 280/231

OTHER PUBLICATIONS

Aug. 21, 2015, Extended European Search Report from the European Patent Office in European Patent Application No. 13743050.0, which shares the same priority as this U.S. application.

Jul. 6, 2015, Patent Examination Report No. 1 from IP Australia in Australian Patent Application No. 2013214967, which shares the same priority as this U.S. application.

* cited by examiner

TANDEM BICYCLE

CROSS-REFERENCE TO RELATED APPLICATIONS

This application is a non-provisional application that claims priority benefit of U.S. Provisional Application Ser. No. 61/593,718, filed Feb. 1, 2012 the contents of which are hereby incorporated by reference.

FIELD OF THE INVENTION

The present invention in general relates to bicycles, and in particular to improvements in tandem bicycles.

BACKGROUND OF THE INVENTION

The tandem bicycle is a form of bicycle designed to be ridden by more than one person. The term tandem refers to the seating arrangement that is fore to aft, not side-by-side. Compared to a conventional bicycle, a tandem has double the pedaling power with only slightly more frictional loss in the drivetrain. Tandem bicycles have about the same wind resistance as a conventional bicycle. High-performance tandems may weigh less than twice as much as a single bike, so the power-to-weight ratio may be slightly better than that of a single bike and rider. On flat terrain and downhill, most of the power produced by cyclists is used to overcome wind resistance, so tandems can reach higher speeds than the same riders on single bicycles. However, tandem bicycles may be slower on climbs, in part due to the need for a high level of coordination between the riders, especially if the physical abilities of the two riders are very different, requiring a compromise on cadence.

In conventional tandems, the front rider steers as well as pedals the bicycle and is also known as the captain, pilot, or steersman; the rear rider only pedals and is also known as the stoker, navigator, or rear admiral. On most tandems two sets of cranks are mechanically linked by a timing chain and turn at the same rate. The transfer of power from all pedals to the rear wheel requires a drive train. Typically, the front most crankset turns the timing chain, which in turn connects to the rear crankset, which transfers this power to the drive chain that connects to the rear wheel. This configuration is called crossover rear drive, and requires both of the rear riders crank arms to have chainrings mounted. Tandem riders may choose to synchronize their pedaling through in-phase (IP) or out-of-phase (OOP) pedaling. In in-phase pedaling, each rider's cranks are in the same or opposite clock positions at any point in time. In out-of-phase pedaling, both riders have their cranks in differing non-opposite positions.

Bicycles, including tandem versions, are built on a frame to which wheels and other components are fitted. The frame is typically constructed from a series of tubes arranged as triangles. A diamond frame 10 typically is formed of two triangles, as shown in prior art FIG. 1, a main triangle 12 and a paired rear triangle 14. The main triangle 12 has a head tube 16, top tube member 18, down tube 20, and seat tube 22. The rear triangle 14 includes the seat tube 22, and paired chain stays 24 and seat stays 26. The head tube member 16 contains the headset, the steering bearings for the fork 28 via the steerer tube, and interfaces with the steering handlebars 30. The fork 28 secures the steerable front wheel 32, while the junction of the chain stays 24 and seat stays 26 acts as an attachment point for the rear wheel 34. The top tube member 18, or cross-bar, connects the top of the head tube member 16 to the top of the seat tube 22. The seat tube 22 accommodates the post 36 from the seat 38 or saddle.

Traditional tandem bicycles have certain drawbacks that include a long wheelbase of that reduces the portability and maneuverability of the bicycle, as well as storage and transport of the bicycle. The rear rider of a tandem bicycle has no control over the steering of the bicycle, and in general the forward field of vision of the rear rider is impaired by the front rider. Furthermore, besides reducing the rear rider's view, the seating arrangement of a tandem bicycle also separates the riders from each other so that they cannot interact or communicate easily. The separation of the riders on a tandem bicycle is a serious detriment for social or leisure riding. In fact, riders on a tandem bicycle may feel more isolated from one another than if they were riding side-by-side on separate standard bicycles. The lack of the rear rider's control, sense of participation, and separation from their fellow rider is potentially detrimental to their experience of riding a tandem bicycle.

An example of a short tandem that can be ridden by a single rear rider is known for example as the "Buddy Bike" with the first distance between the head tube and front seat post is typical or near Union Cycliste Internationale (UCI) standard teachings, rather the short length of said tandem types is derived by shortening the second distance between the front seat tube and rear seat tube compared to standard length tandems. The short tandem Buddy Bike has a front distance that is 17 percent greater than the rear distance. While a standard UCI racing tandem has a first distance of 75-90 percent of the second distance. The UCI tandem's first distance is typical of all bicycle prior art. The UCI tandem are not like short tandems, and the second distance is greater in length due to added space for the rear rider to get into a long aerodynamic body shape, thus the first position would be less. As a result the first distance reduction can be construed to be unrelated to frame shortening technology.

Thus, there exists a need for a more compact and easily transportable tandem bicycle that increases the involvement and participation of the rear rider.

SUMMARY OF THE INVENTION

A tandem bicycle is provided that is compact and easily transportable, while increasing the involvement and participation of the shorter of the two riders. A tandem bicycle is provided that has a shortened wheel base between the front and rear wheels that allows a rider to ride comfortably alone from either the front or rear seats, or with a passenger in the front seat. The frame length of a tandem bicycle is comparable to a standard single seat bicycle. The reduced proximity between riders, and the ability to steer from both the front or rear seats on the tandem bicycle improves the level of participation and interaction between the riders. In certain embodiments, the wheelbase is reduced by bringing the front wheel closer to the front seat position. A reduced diameter front wheel is provided to accommodate rotational clearance of the front pedals thereby allowing two riders to ride on bicycle frame with a length common to single rider bicycle.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DESCRIPTION OF THE INVENTION

An inventive tandem bicycle is provided that is compact and easily transportable, while increasing the involvement and participation of the shorter of the two riders. Embodiments of the inventive tandem bicycle have a shortened wheel base between the front and rear wheels that allows a rider to ride comfortably alone from either the front or rear seats, or with a passenger in the front seat. The frame length of the inventive tandem bicycle is comparable to a standard single seat bicycle. The reduced proximity between riders, and the ability to steer for both the front or rear seats on the inventive tandem bicycle improves the level of participation and interaction between the riders. In embodiments the wheelbase is reduced by bringing the front wheel closer to the front seat position.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Figure 1:
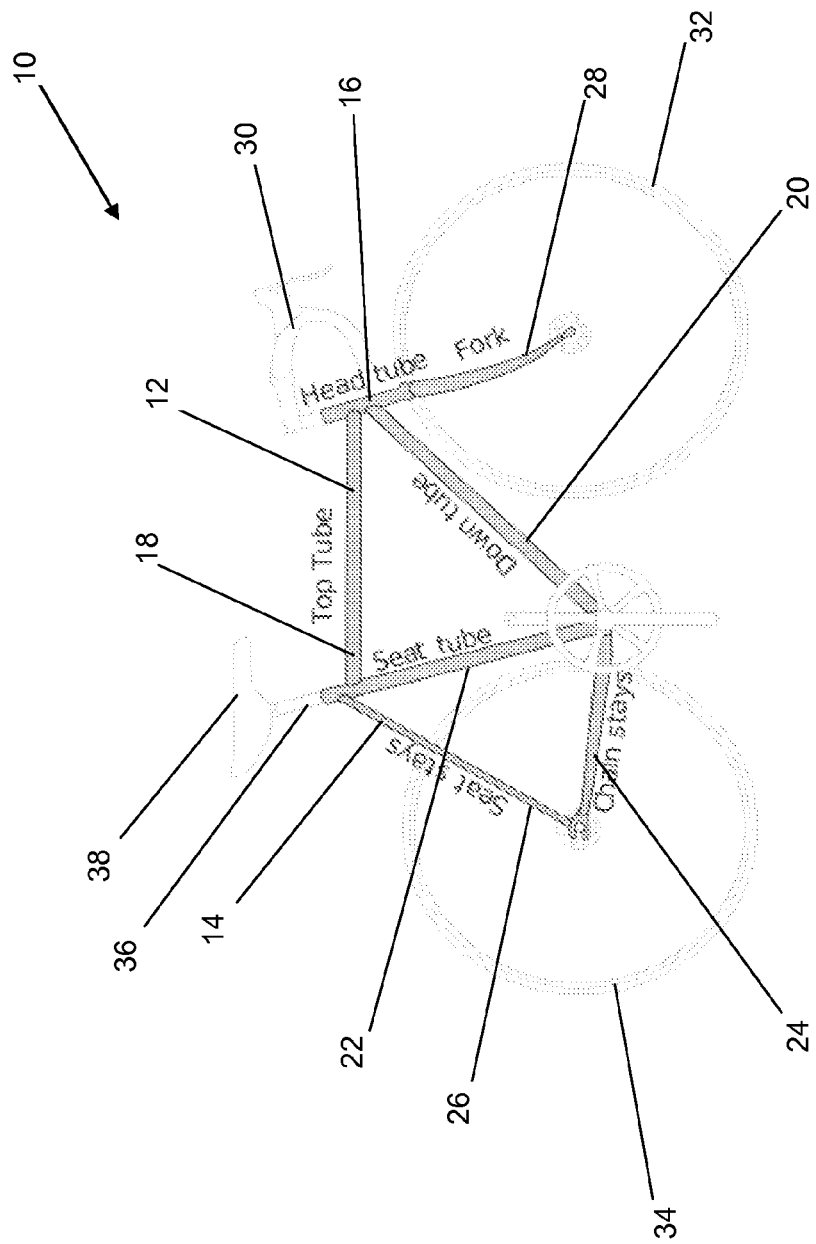
FIG. 1 illustrates a typical prior art bicycle frame.
Figure 2:
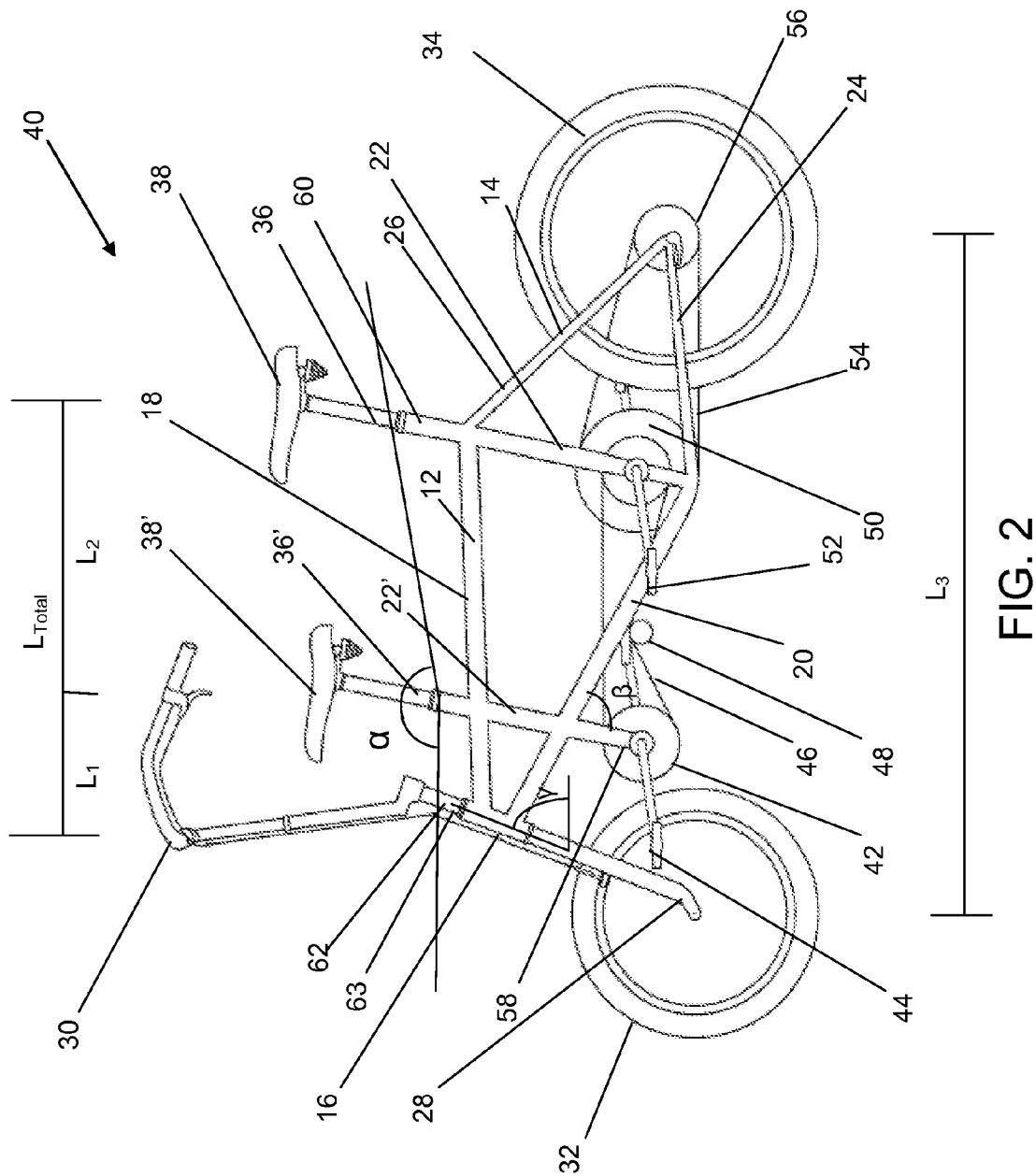
FIG. 2 illustrates a side perspective view of a tandem bicycle according to an embodiment of the invention.
Figure 3:
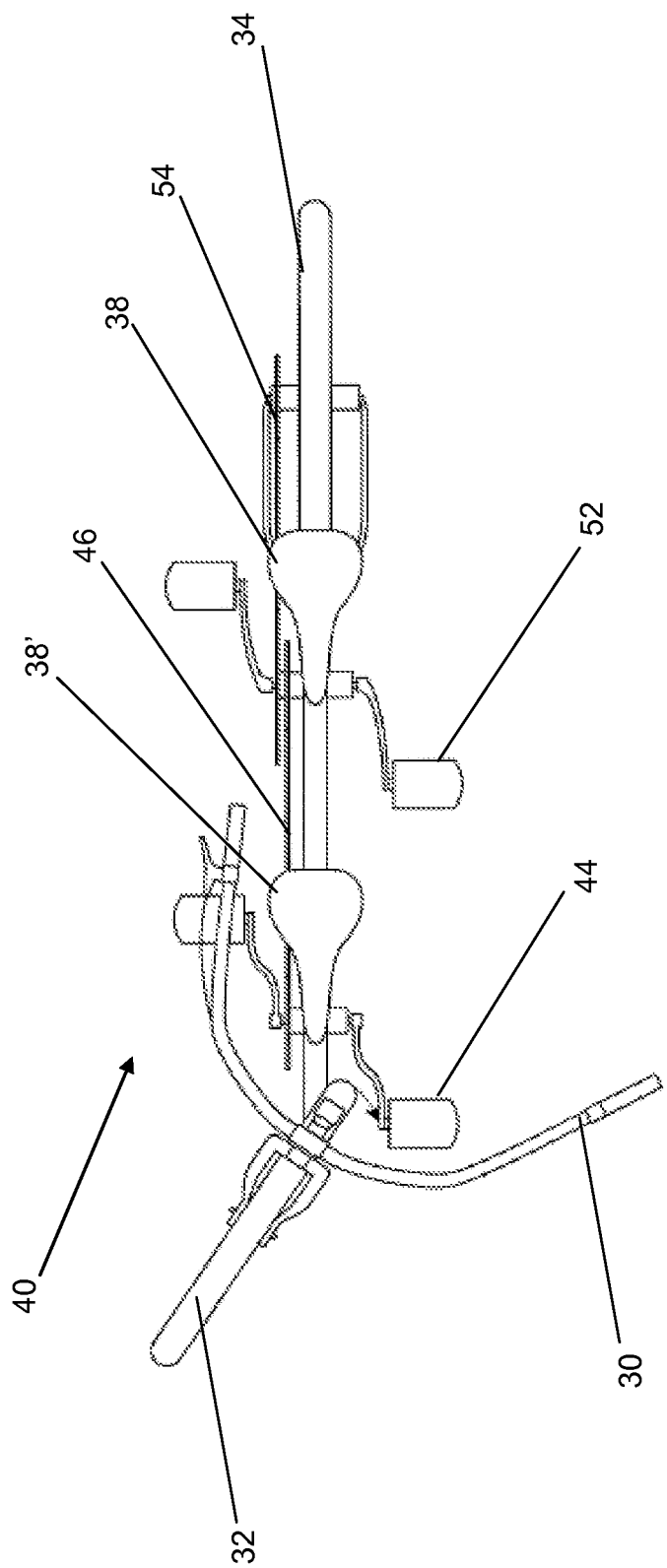
FIG. 3 illustrates a top perspective view of a tandem bicycle according to an embodiment of the invention.
Figure 4:
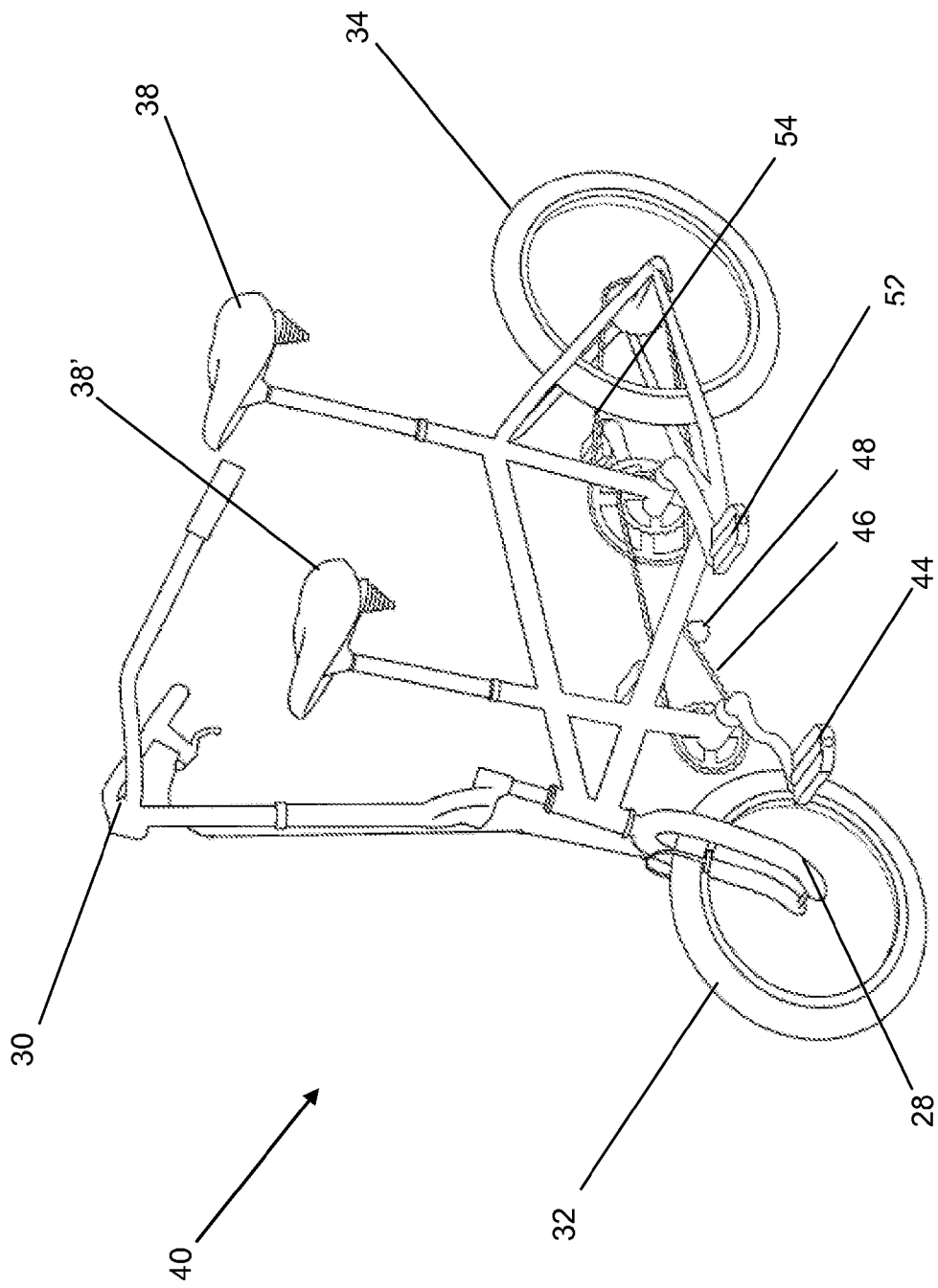
FIG. 4 illustrates a side elevation perspective view of a tandem bicycle according to an embodiment of the invention.

Referring now to FIGS. 2-4 an embodiment of the inventive tandem bicycle is shown generally at 40, with like numbers shared between figures. The embodiment of inventive tandem bicycle 40 is built on a diamond frame consisting of two triangles, as was previously shown in FIG. 1, a main triangle 12 and a paired rear triangle 14. The main triangle 12 consists of the head tube member 16, top tube member 18, down tube member 20, rear seat tube 22, and is bisected by front seat tube 22'. In certain embodiments of an inventive tandem bicycle, the overall length ($L_{Total}$) of the top tube member 18 is comparable to a typical prior art bicycle designed for a single rider per FIG. 1. It is appreciated that in some embodiments, top tube member 18 is omitted to create greater clearance for a rear rider at the expense of weakened frame. In such instances where top tube 18 is omitted, the frame is strengthened by conventional techniques such as frame material choice or increased tubular diameter for down tube member 20. As seen in FIG. 2, the overall length of the top tube member 18 is made up of two subsections: a first length ($L_1$) from the head tube member 16 to the front seat tube 22', and a second length ($L_2$) from the front seat tube 22' to the back seat tube 22. The rear triangle 14 is defined by the rear seat tube 22, and paired chain stays 24 and seat stays 26. The head tube member 16 contains the headset, and the steering bearings for the fork 28 via the stem 62, and interfaces with the steering handlebars 30. The fork 28 secures the steerable front wheel 32, while the junction of the chain stays 24 and seat stays 26 acts as an attachment point for the rear wheel 34. The top tube member 18, or cross-bar, connects the top of the head tube member 16 to the top of the rear seat tube 22 and front seat tube 22' in certain embodiments, while in other embodiments, while in other embodiments, the top bar member 18 is omitted. The rear seat tube 22 accommodates or engages the post 36 from the rear seat 38 or saddle, while front seat tube 22' accommodates or engages the post 36' from the front seat 38'. Both the front seat 38' and rear seat 38 are removably and adjustably attached to their respective seat tubes 22' and 22 via seat posts 36' and 36, respectively. In certain embodiments, an angle α of between 150 and 170 degrees is defined between the horizon for the orientation shown and the line between the tops of posts 36-36'. The bottom of front seat tube 22' has a downward extension tube 58 extending below the down tube member 20 that is attached to a front bottom bracket to hold and engage a timing or front crankset 42 and front pedals 44, which drives or turns a timing chain 46 suspended with a timing chain adjuster 48, to adjust the timing chain 46. The timing chain 46 in turn connects to the rear crankset 50 attached to rear pedals 52, which transfers this power to the drive chain 54 that connects to the rear wheel 34 via gear set 56. The rear seat tube 22 holds or engages the rear crankset 50 and terminates at the intersection of the down tube 20 and the rear chain stays 24. Together, the timing chain 46 and drive chain 54 form a power transmission that may be operated by a first and a second rider either individually or together, while seated in the front seat 38', rear seat 38, or both.

The handle bar 30 is movably connected to the head tube member 16 via stem 62 of the tandem frame. In certain inventive embodiments, the stem 62 may be similar to the up and down adjustable stem found on folding bikes, or the stem 62 has a hinge 63 for easier transportation in a similar fashion to stems used on folding bikes. Additionally, it is appreciated that the stem 62 may be adjusted to different angles front to back.

Figure 5:
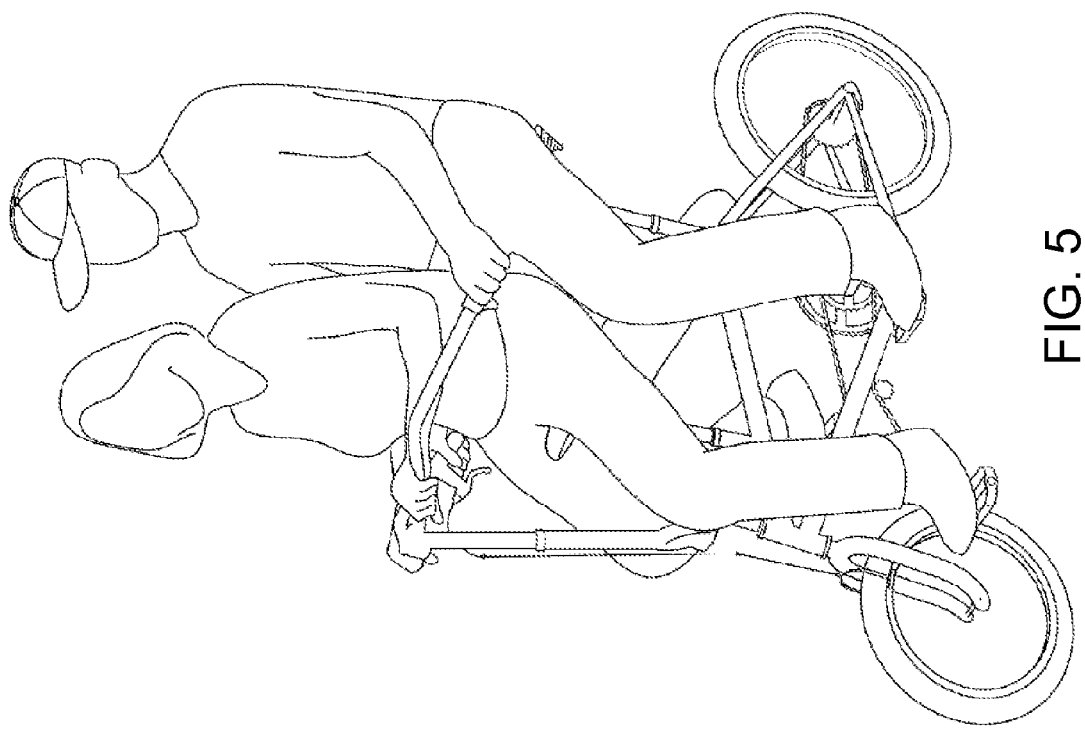
FIG. 5 illustrates a front and rear rider riding the tandem bicycle according to an embodiment of the invention.
Figure 6:
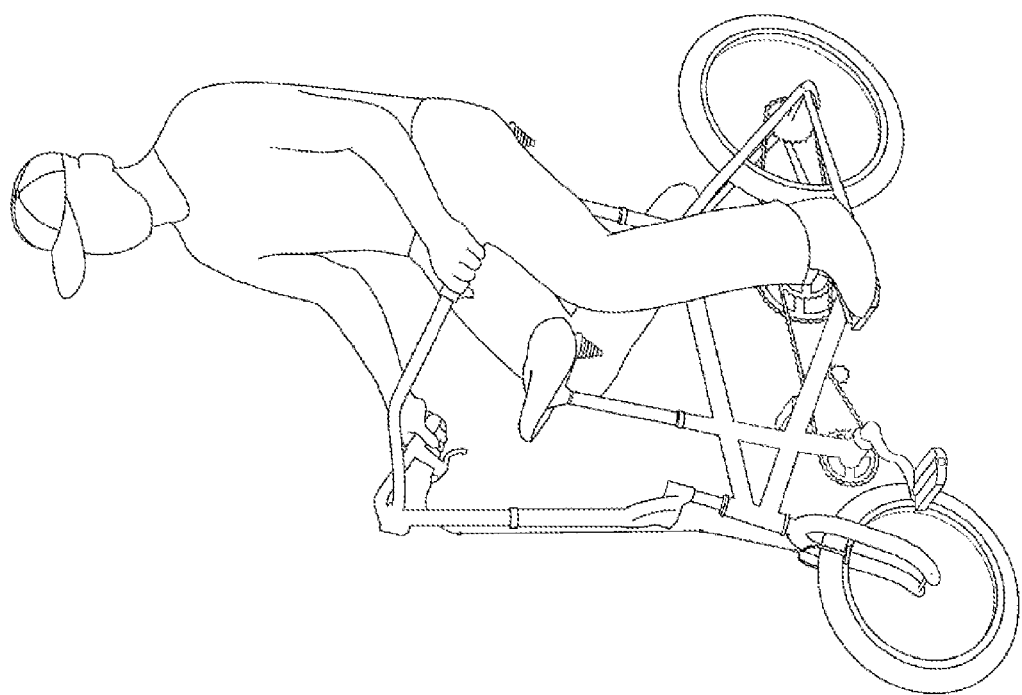
FIG. 6 illustrates a rear rider in the rear seat controlling the tandem bicycle according to an embodiment of the invention.

The handle bar 30 is adapted to be manipulated by either at least one of the first or second riders sitting on the front 38' or back seat 38 as shown in FIGS. 5 and 6. FIG. 5 illustrates a front and rear rider riding the tandem bicycle. FIG. 6 illustrates a rear rider in the rear seat controlling the tandem bicycle. In certain inventive embodiments, the handle bar 30 includes elongated handle bars adapted to allow a rider positioned on the back seat 38 to be able to steer from the back seat 38.

In certain inventive embodiments of the tandem bicycle 40, a first distance ($L_1$) between the head tube member member 16 and front seat tube member 22' is less than 75 percent the length of a second distance ($L_2$) between the rear seat tube member 22 and the front seat tube member 22'. In still other embodiments, the distance ($L_1$) between the head tube member 16 and said front seat tube member 22' is less than 50 percent the length of the top tube member 18. The inventive tandem with a first distance being less than 75 percent of the second distance or even less than 50 percent of the second distance, thereby providing advantages of handling, transport, and unparalleled utility for the single rider.

In certain inventive embodiments of the tandem bicycle 40, the distance ($L_1$) between the head tube member 16 and the front seat tube member 22' is less than 14 inches. In other inventive embodiments, the distance ($L_1$) between the head tube member 16 and the front seat tube member 22' is 6 inches.

In other inventive embodiments of the tandem bicycle 40, a wheel base distance ($L_3$) between the front 32 and the back wheels 34 is 41.5 inches, and the distance ($L_1$) between the head tube member 16 and the front seat tube member 22' is less than 14 inches.

In other inventive embodiments of the tandem bicycle 40, the diameter of the front wheel 32 is less than the diameter of the back wheel 34.

In other inventive embodiments of the tandem bicycle 40, the front seat tube member 22' downward extension tube 58 extends below the down tube member 20, such that an angle between the riding surface and the down tube member is greater than 20 degrees.

In other inventive embodiments of the tandem bicycle 40, the rear seat tube member 22 has a upward extension tube 60 above the top tube member 18 that engages the rear seat post 36. The upward tubular extension tube 60 is reinforced and serves as a strengthening member for the rear seat post 36.

In an embodiment of the tandem bicycle 40, the front pedals 44 form a set of left and right pedals for the front seat 38' that define left and right crank rotational planes, and a perpendicular distance between the left and right crank rotational planes that is used to define an allowed diameter of the front wheel 32 to thereby avoid contact between the set of left and right pedals of front pedals 44, or a rider's toes, with the front wheel 32. The position of the front wheel 32 is also determined by the angle of the head tube member 16. The head tube member 16 may be at an angle γ between 50-80 degrees allows the front wheel 32 to be positioned within the left and right crank rotational planes of the left and right pedals of the front seat 38'.

In other embodiments of the present invention, a tandem bicycle is provided in which the maximal radius of pedals and cranks intersects the front wheel radius. This is particularly advantageous in an inventive bicycle with front wheel of 20 inches or less. It has been surprisingly discovered that when a wheel is intersecting a crank radius, an increase turn angle is realized as wheel diameter decreases. To facilitate greater limited steering tube angles or no interference, such an inventive bicycle is optionally combined with widened front cranks.

In another inventive embodiment, a tandem bicycle is provided with a total top tube length shorter than 30 inches which is the length of adult single rider bicycle top tubes and is considerably shorter than conventional tandem bicycles. By way of example, a road race tandem has a top tube length of 46 inches, the Buddy Bike tandem has a top tube length 37 inches, while single ridden bicycles have a top tube lengths of 28-19 inches. This is particularly advantageous in an inventive bicycle with front wheel of 20 inches or less. It has been surprisingly discovered that when a wheel is intersecting a crank radius, an increase turn angle is realized as wheel diameter decreases. To facilitate greater limited steering tube angles or no interference, such an inventive bicycle is optionally combined with widened front cranks.

In another inventive embodiment, the tandem bicycle is provided with widened rear cranks relative to the separation of their respective right and left sides, to alleviate the potential of the rear rider's knees from striking the buttock or body of the front rider, unexpectedly allowing for decreased rear top tube length than would otherwise to possible with standard width cranks for the rear rider of any tandem bicycle.

In another inventive embodiment, the tandem bicycle is provided with a weight distribution similar to the range of single ridden bicycles when the tandem is ridden singularly and from the rear position. The length ratio is derived from front axle to rear seat and back axle to rear seat. An inventive tandem bicycle with ratio within 30% of a single rider bicycle ratio is also contemplated.

In another inventive embodiment, the tandem bicycle is provided with a Wheelbase to Rear Crank (WRC) ratio similar to the range of single ridden bicycles when the tandem is ridden singularly from the rear position while not similar to the range of taught tandems. The WRC length ratio is derived from the distance between the rear axle and rear crankset center point divided by the distance between front and rear axles. An inventive tandem bicycle with ratio within 30% of a single rider bicycle ratio is also contemplated. An inventive tandem bicycle has a WRC of 0.28 to 0.42, while in other embodiments; an inventive tandem has a WRC range from of 0.30 to 0.39. In contrast to the present invention, a, tandem bicycle from UCI road race, short Buddy Bike, and Schwinn short tandem T-5 have WRCs of 0.273, 0.273, and 0.25, respectively; a conventional UCI road race bicycle and Schwinn cruiser bike have WRCs of 0.273 and 0.41, respectively. While tandems with WRC ratios similar to non-tandem bicycles have obvious advantages for handling, and although it might seem obvious careful study shows an increased chainstay length is required to counter the long total top tube or first and second distance of tandem bicycles. Chain stay lengthening is counter intuitive to an already long tandem when ridden as a tandem. It is further counter intuitive when the purpose is to make the tandem for single riders where length reduction is more critical.

The foregoing description is illustrative of particular embodiments of the invention, but is not meant to be a limitation upon the practice thereof. The following claims, including all equivalents thereof, are intended to define the scope of the invention.

The invention claimed is:
1. A tandem bicycle comprising:
    a front wheel and a back wheel;
    a frame suspended between said front wheel and said back wheel, said frame including a front seat tube member and a back seat tube member located at predetermined positions thereon in relative proximity to said front and back wheels;
    a head tube member located at a front end of said tandem bicycle in mechanical communication with a handle bar and a steerable fork, said fork movably connected to said front wheel;
    a front seat and a back seat removably and adjustably attached to said respective front and back seat tube members;
    a power transmission adapted to be operable by a first and a second rider either individually or together, the power transmission including a first set of left and right pedals for the back seat located adjacent a bottom end of said back seat tube member, and a second set of left and right pedals for the front seat located adjacent a bottom end of said front seat tube member;
    wherein said handle bar is movably connected to said head tube member of said frame and is adapted to be manipulated by either at least one of said first or second riders sitting on said front or back seat;
    wherein a first distance between the head tube member and front seat tube member is less than half the length of a second distance between said rear seat tube member and said front seat tube member; and
    wherein a maximal radius of the second set of left and right pedals intersects a radius of the front wheel when viewed normal to the plane of the front wheel.
2. The tandem bicycle of claim 1, wherein the distance between the head tube member and said front seat tube member is less than one-third the length of said top tube member.
3. The tandem bicycle of claim 1, wherein the distance between the head tube member and said front seat tube member is less than one-quarter the length of said top tube member.
4. The tandem bicycle of claim 1, wherein the distance between the head tube member and the front seat tube member is less than 14 inches.

5. The tandem bicycle of claim 1, wherein the distance between the head tube member and the front seat tube member is 6 inches.

6. The tandem bicycle of claim 1, wherein a wheel base distance between said front and said back wheels is less than 41.5 inches, and the distance between the head tube member and the front seat tube member is less than 14 inches.

7. The tandem bicycle of claim 1, wherein front and rear seat tubes members have a front seat post top and a rear seat post top, the front seat post top and rear seat post top defining a line forming an angle relative to the horizon of between 150 and 175 degrees when the tandem bicycle is on level ground.

8. The tandem bicycle of claim 1 further comprising a top tube member.

9. The tandem bicycle of claim 8, wherein said frame includes a diamond shape formed by said top tube member, said back seat tube member, and a down tube between a front end of said top tube member and a bottom end of said back seat tube member.

10. The tandem bicycle of claim 8, wherein said frame further comprises a front seat tube member downward extension tube extending below said down tube, such that an angle between the riding surface and the down tube is greater than 20 degrees.

11. The tandem bicycle of claim 1, wherein the second set of left and right pedals for the front seat define left and right crank rotational planes, and a perpendicular distance between said left and right crank rotational planes is used to define the allowed diameter of said front wheel to thereby avoid contact between the second set of left and right pedals, or a rider's toes, with said front wheel.

12. The tandem bicycle of claim 1, wherein said head tube member is attached to the said frame at an angle of between 50-80 degrees that allows said front wheel to be positioned within left and right crank rotational planes of left and right pedals of said front seat.

13. The tandem bicycle of claim 1, wherein said handle bar includes elongated handle bars adapted to allow a rider positioned on said back seat to be able to steer from said back seat.

14. The tandem bicycle of claim 1, wherein said front wheel and said rear wheel define a wheelbase and said transmission comprises a rear crank, wherein the wheelbase to rear crank define a ratio (WRC) is between 0.28 and 0.42.

15. The tandem bicycle of claim 1, wherein said front wheel has a smaller front wheel diameter than a rear wheel diameter of said rear wheel.

16. A tandem bicycle comprising:
a front wheel and a back wheel;
a frame suspended between the front wheel and the back wheel, the frame including a front seat tube member and a back seat tube member located at predetermined positions thereon;
a head tube member located at a front end of said tandem bicycle in mechanical communication with a handlebar and a steerable fork movably connected to the front wheel;
a front seat and a back seat adjustably attached to the respective front and back seat tube members;
a power transmission including a first set of left and right pedals located in proximity to a bottom end of said back seat tube member, and a second set of left and right pedals for the front seat located at a bottom end of said front seat tube member;
wherein the handlebar is manipulable by a rider sitting on the front or back seat; and
wherein a first distance between the head tube member and front seat tube member is less than half the length of a second distance between said rear seat tube member and said front seat tube member; and
wherein the head tube member defines a long axis angled at approximately 50 to approximately 80 degrees from horizontal, and the long axis of the head tube member is capable of intersecting the front seat.

17. The tandem bicycle of claim 16, the handlebar including a riser portion extending higher than the front seat, the riser portion defining a riser angle with respect to horizontal, wherein the riser angle is greater than the angle formed by the long axis of the head tube member.

18. The tandem bicycle of claim 17, wherein the riser angle is greater than 90 degrees from horizontal.

19. A tandem bicycle comprising:
a front wheel and a back wheel;
a frame suspended between the front wheel and the back wheel, the frame including a front seat tube member and a back seat tube member located at predetermined positions thereon;
a head tube member located at a front end of said tandem bicycle in mechanical communication with a handlebar and a steerable fork movably connected to the front wheel, the handlebar having a pair of distal end portions;
a front seat and a back seat adjustably attached to the respective front and back seat tube members; and
a power transmission including a first set of left and right pedals located in proximity to a bottom end of said back seat tube member, and a second set of left and right pedals for the front seat located at a bottom end of said front seat tube member;
wherein the handlebar is manipulable by a rider sitting on the back seat; and
wherein the head tube member defines a long axis that intersects the handlebars proximate the distal end portions when viewed normal to the plane of the front wheel.

20. The tandem bicycle of claim 19, wherein the distal end portions of the handlebar are directly above the front seat when viewed normal to the plane of the front wheel.

* * * * *